TAPE GUIDE

Filed June 8, 1961

INVENTOR.
PAUL E. IRELAND

BY Arthur H. Swanson

ATTORNEY.

United States Patent Office 3,181,808
Patented May 4, 1965

3,181,808
TAPE GUIDE

Paul E. Ireland, Hyattsville, Md., assignor to Honeywell Inc., a corporation of Delaware Filed June 8, 1961, Ser. No. 115,640
4 Claims. (Cl. 242—76)

This invention relates to tape transports. More specifically, the present invention relates to tape guide means for tape transports.

An object of the present invention is to provide an improved tape guide means.

Another object of the present invention is to provide an improved tape guide means for uniformly guiding thin tapes.

A further object of the present invention is to provide an improved tape guide means which is characterized by the ability to handle tapes having different widths.

A still further object of the present invention is to provide an improved tape guide means, as set forth herein, which is characterized by simplicity of operation and construction.

In accomplishing these and other objects, there has been provided, in accordance with the present invention, a tape guide means having a fixed guide plate extending along the path of a moving tape whereby an edge of the tape is in contact with the guide plate. A plurality of rotatably supported rollers are attached to the guide plate for supporting the tape. A plurality of spacers are attached to the guide plate for selectively positioning a movable guide plate at a predetermined distance from the fixed plate. The movable plate is also arranged to extend along the path of the tape in a parallel relationship with the fixed plate and a contact with the other edge of the tape whereby to guide the moving tape in a fixed path.

A better understanding of the present invention may be had from the following detailed description, when read in connection with the accompanying drawings, in which.

Figures 1, 2:
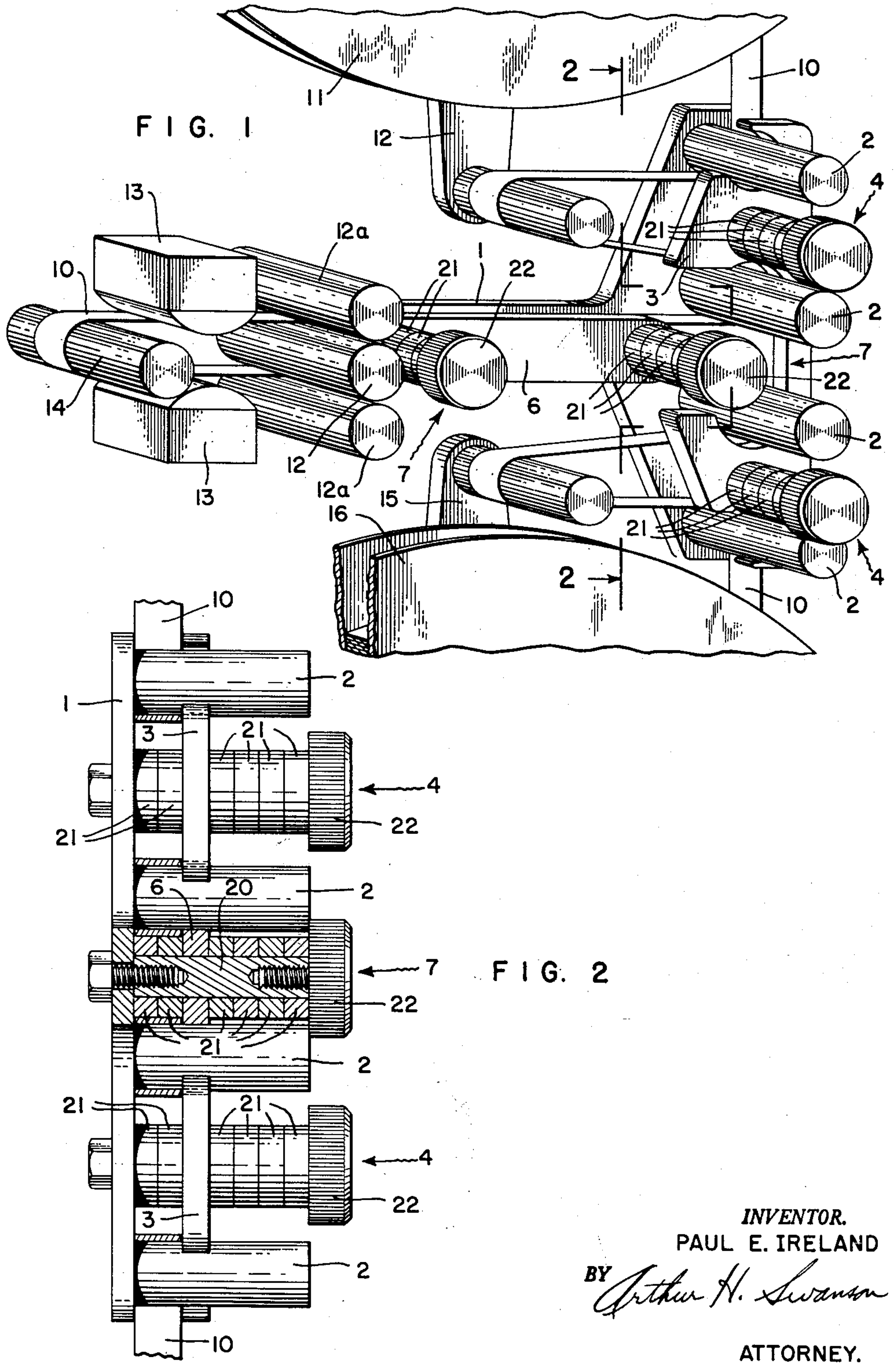
FIG. 1 is a pictorial representation of tape guide means embodying the present invention.
FIG. 2 is a cross-section of FIG. 1 taken along line 2—2.

Referring to FIG. 1 in more detail there is shown a tape guide means having a fixed tape guide plate 1 having a plurality of rotatably-supported flangeless and uncrowned tape rollers 2 mounted thereon. A first movable tape guide plate 3, having cutout sections for accommodating the rollers 2, is supported on a pair of fixed supports 4 attached to the fixed guide plate 1. The movable guide plate 3 is arranged on the supports 4 in a parallel spaced relationship with respect to the fixed plate 1.

A second movable guide plate 6 is supported perpendicular to said first plate 3 by a pair of fixed supports 7 attached to the fixed plate 1. The second guide plate 6 is also arranged in a parallel spaced relationship with respect to the fixed plate 1 and with a spacing substantially identical to that of the first plate 3. A tape 10 is fed from a supply reel 11 and follows a circuitous path through the tape guide means wherein it is tensioned by a tensioning idler 12. In the aforesaid path, the tape 10 also passes over a pair of the rollers 2 with one tape edge in contact with the fixed plate 1 and the other edge in contact with the movable plate 3. Similarly, the tape 10 is further arranged to pass between and to contact the fixed plate 1 and the second movable plate 6. The tape 10 is supported between the fixed plate 1 and the second movable plate 6 by the fixed supports 7. After leaving the supports 7, the tape 10 passes over a tape-driving capstan 12 having pressure rollers **12*a* for pressing the tape 10 against the capstan 12. A plurality of magnetic recording or reading heads 13 may be positioned adjacent to the tape 10 between the capstan 12 and a turn-around roller 14**.

After passing around the turn-around roller 14 and over the capstan 12, the tape 10 is returned to the aforesaid space between the fixed plate 1 and the second movable plate 6. Subsequently, the tape 10 is arranged to pass between the fixed plate 1 and the first movable plate 3 wherein it is supported by another pair of the rollers 2. Further the tape 10 is arranged to pass around a second tensioning idler 15 and is finally returned to a take-up reel 16.

Referring to FIG. 2, there is shown a cross-section of the guide means shown in FIG. 1 taken along the line 2—2. As may be seen from FIG. 2, each of the fixed supports 4 and 7 has a center hub 20 attached to the fixed plate 1 with a plurality of spacers 21 stacked thereon. An end cap 22 is used to retain the spacers 21 on the hub 20. The spacers 21 may be selectively arranged on the hub 20. The movable plates 3 and 6 are fitted on the hubs 20 by means of holes which allow the hubs 20 to pass through the plates 3 and 6. However, these holes are not large enough to pass the spacers 21. Thus, the spacers 21 may be used to determine the spacing of the movable plates 3 and 6 and the fixed plate to accommodate various tape widths. Further, the spacers 21 may be of selective widths to accommodate the various tape widths upon a corresponding one of the spacers 21. The spacers 21 which are not utilized to space the plates 3 and 6 are stacked on the hubs 20 on the outside of the plates 3 and 6. The end caps 22, as previously mentioned, are used to retain the spacers 21 and the selectively spaced plates 3 and 6 on the hubs 20. Further, in the case of the supports 7, the spacers 21 are used to support the tape 10 between the fixed plate 1 and movable plate 6.

In operation, the tape 10, driven by the capstan 12, is guided from the supply reel 11 to the take-up reel 16 by the fixed plate 1 and the movable plates 3 and 6. As a result of the large area of guiding contact with the tape 10 and the rigidity of the guide plates 1, 3 and 6, the tape 10 is precisely guided without regard to its thickness.

Thus, it may be seen that there has been provided, in accordance with the present invention, a tape guide means for uniformly guiding tapes having different widths and, in particular, for such tapes of a thin material.

What is claimed is:

1. A tape guide means comprising a fixed guide plate extending along a portion of a path of said tape, said plate being arranged to be in contact with one edge of said tape, a plurality of rotatably-supported rollers mounted on said plate and operative to support a tape whereby to define said portion of a path of said tape between said rollers, a movable guide plate, a plurality of fixed supports mounted on said fixed plate including means for supporting said movable guide plate along said portion of a path of said tape and in contact with the other edge of said tape, and spacing means on said fixed supports for selectively spacing said movable plate with respect to said fixed plate to accommodate different tape widths.

2. A tape guide means comprising a fixed guide plate extending along a portion of a looped path of said tape, said plate being arranged to be in contact with one edge of said tape, a plurality of rotatably-supported rollers mounted on a first portion of said plate and operative to support a tape whereby to define said portion of a looped path between said rollers, a first movable guide plate, said movable guide plate having a shape substantially identical to said first portion of said fixed guide plate and having cutout sections to accommodate said rollers, a first plurality of fixed supports mounted on said fixed plate for supporting said movable plate parallel to said fixed plate along a first portion of said looped path of said tape and in contact with the other edge of said tape, a second movable guide plate, said second movable guide plate having a shape substantially identical to a second portion of said fixed guide plate, a second plurality of fixed supports mounted on said fixed plate for supporting said second guide plate parallel to said fixed plate along a second portion of said looped path of said tape and in contact with the other edge of said tape, and spacing means on said fixed supports for selectively spacing said first movable plate and said second movable plate with respect to said fixed plate to accommodate different tape widths.

3. A tape guide means comprising a fixed guide plate extending along a portion of a looped path of said tape, said plate being arranged to be in contact with one edge of said tape, a plurality of rotatably-supported rollers mounted on a first portion of said plate and operative to support a tape whereby to define said portion of a looped path between said rollers, a first movable guide plate, said movable guide plate having a shape substantially identical to said first portion of said fixed guide plate and having cutout sections to accommodate said rollers, a first plurality of fixed supports mounted on said fixed plate for supporting said movable plate parallel to said fixed plate along a first portion of said looped path of said tape and in contact with the other edge of said tape, a second movable guide plate, said second movable guide plate having a shape substantially identical to a second portion of said fixed guide plate, a second plurality of fixed supports mounted on said fixed plate for supporting said second guide plate perpendicular to said first guide plate and parallel to said fixed plate along a second portion of said looped path of said tape and in contact with the other edge of said tape, and spacing means on said fixed supports for selectively spacing said first movable plate and said second movable plate with respect to said fixed plate to accommodate different tape widths.

4. A tape guide means comprising at least two rotatably-supported rollers operative to support a tape extending between said rollers, a fixed guide plate arranged to support said rollers and to contact one edge of said tape along a path between said rollers, a movable guide plate, a plurality of fixed supports mounted on said fixed plate and including means for supporting said movable guide plate in contact with the other edge of said tape between said rollers, and spacing means on said fixed supports for selectively spacing said movable plate with respect to said fixed plate to accommodate different tape widths.

References Cited by the Examiner

UNITED STATES PATENTS

| | | | |
|---|---|---|---|
| 1,879,084 | 9/32 | Chaney | 242—76 X |
| 1,921,405 | 8/33 | Cullen | 242—76 |
| 2,174,194 | 9/39 | Nemnich | 88—17 |
| 2,273,565 | 2/42 | Euth et al. | 226—199 X |
| 2,594,800 | 4/52 | Ranney | 242—81 X |
| 2,747,807 | 5/56 | Hummel | 242—55.2 |
| 2,916,228 | 12/59 | Wellington | 242—76 |
| 2,950,072 | 8/60 | Hayashida et al. | 242—76 |
| 2,988,294 | 6/61 | Neff | 242—75.52 X |

MERVIN STEIN, *Primary Examiner.*

JOSEPH P. STRIZAK, RUSSELL C. MADER, DONALD W. PARKER, *Examiners.*